United States Patent [19]

Geppert et al.

[11] 4,101,047
[45] Jul. 18, 1978

[54] LAMINATED MATERIAL OF THERMOPLASTIC SYNTHETIC MATERIAL, PROCESS OF MAKING AND CONTAINER CLOSED THEREWITH

[75] Inventors: Barbara Geppert; Kurt Huth, both of Wiesbaden, Fed. Rep. of Germany

[73] Assignee: Bellaplast GmbH, Wiesbaden, Fed. Rep. of Germany

[21] Appl. No.: 715,219

[22] Filed: Aug. 18, 1976

[30] Foreign Application Priority Data

Aug. 22, 1975 [DE] Fed. Rep. of Germany ....... 2537435

[51] Int. Cl.² .......................... B65D 5/64; B29F 3/10; B29C 19/00; B32B 27/08
[52] U.S. Cl. ..................................... 220/258; 229/43; 156/244.11; 264/165; 264/171; 428/35; 428/412; 428/515; 428/520
[58] Field of Search ................ 428/35, 412, 515, 520, 428/522, 523; 264/165, 171; 220/256, 257, 258; 229/43, 515 C, 515 TC; 156/244

[56] References Cited

U.S. PATENT DOCUMENTS

| | | | |
|---|---|---|---|
| 3,301,464 | 1/1967 | Amberg | 229/43 |
| 3,394,861 | 7/1968 | Truax | 220/256 |
| 3,453,173 | 7/1969 | Isleg | 428/523 |
| 3,491,935 | 1/1970 | Trotter, Jr. et al. | 428/515 |
| 3,597,298 | 8/1971 | Stengle, Jr. | 229/43 |
| 3,650,386 | 3/1972 | Tigner | 229/515 C |
| 3,791,915 | 2/1974 | Goehring et al. | 156/244 |
| 3,798,103 | 3/1974 | Gaunt | 428/515 |
| 3,949,114 | 6/1976 | Viola et al. | 428/412 |
| 3,955,006 | 5/1976 | Sokolsky et al. | 220/256 |
| 3,959,432 | 5/1976 | Wiley | 428/412 |
| 3,993,810 | 11/1976 | Bonis | 428/35 |

*Primary Examiner*—William R. Dixon, Jr.
*Attorney, Agent, or Firm*—Strauch, Nolan, Neale, Nies & Kurz

[57] ABSTRACT

Laminated material for thermoplstic articles of different shapes is produced by extrusion of thermoplastic synthetic material layers, one of which layer contains a predetermined amount of an adhesive material dispersed within it prior to being extruded, whereby an adhesive bond of predetermined strength is provided between the layers to suit various requirements in use.

6 Claims, 6 Drawing Figures

LAMINATED MATERIAL OF THERMOPLASTIC SYNTHETIC MATERIAL, PROCESS OF MAKING AND CONTAINER CLOSED THEREWITH

This invention is concerned with laminated material usually in the form of plates, webs, tubes, profiles, and shapes of thermoplastic synthetic material, prepared in a process in which thermoplastic synthetic material of various types, preferably in particular form, is brought into extrudable condition under heat and pressure and is continuously extruded through an extruding nozzle into a two- or multiple-layer profiled strand, web, or tube, which can be transformed into the final product, for example by thermo-forming, immediately after cooling or after intermediate storage and renewed heating.

It is known, in the case of plastic laminated synthetic material, to bond together layers of materials normally incapable of producing a mutual surface bond, through the addition of an intermediate layer of adhesive material. Apart from the fact that considerable additional cost is involved in providing and interposing the additional layer of adhesive, the adhesive bond between the bonded layers can be varied or modified only by special treatment or not at all, requiring an additional operating step which is also expensive. The adhesive bond between the layers which is produced by the adhesive is generally determined by the cohesion properties of the mostly relatively tacky adhesive substance.

It is the main object of the present invention to selectively provide adhesive capability between the layers of a laminated material which normally does not produce a mutual surface bond, and to select, vary and modify this adhesive capability in order to reliably adapt the laminated material to desired utilization purposes.

The problem is solved in the invention in that at least one of the two layers which are to be bonded together consists of a thermoplastic synthetic material, to which adhesive material is admixed in a quantity and/or of a type previously determined in correspondence with the desired mutual adhesive bond between the two layers.

The invention includes the surprising finding that an improved adhesive bond between two layers of synthetic plastic materials normally not capable of producing a mutual adhesive bond, or not adequately so, between them is attained when adhesive material or materials are admixed into at least one layer of synthetic plastic materail, as during extruding and formation of laminated material. In addition, it has been found surprisingly that it is possible, in this manner, to vary, modify and selectively adjust the adhesive bond strength between such layers in a reproducible predetermined manner, by selecting the adhesive material either in accord with its type, or, still better, in selected proportions of any material.

In comparison with known laminated materials having an intermediate adhesive material layer, the significant advantage of the invention thus results that the adhesive bond strength between the layers can be adjusted from the start, to a measure which is optimized for the utilization purpose of the laminated material.

The invention can advantageously be practiced when one of the two layers which are to be bonded together consists essentially of a polyolefin and the other of a thermoplastic synthetic material containing polystyrene. Another possibility for the practice of the invention is offered in the case of those laminated materials in which one of the two layers which are to be bonded together consists essentially of thermoplastic synthetic material containing polystyrene and the other layer essentially of thermoplastic synthetic material containing acrylonitrile. Another possibility within the scope of the invention is that one of the two layers which are to be bonded together consists essentially of thermoplastic synthetic material containing a polyolefin or essentially of a thermoplastic synthetic material containing polystyrene and the other layer essentially consists of a polycarbonate. Within the scope of this invention, one of the two layers which are to be bonded together can also essentially consist of a polyolefin and the other layer essentially of polymers of methacrylic acid methyl esters or copolymers with a predominant proportion of methacrylic acid methyl ester. The lamination is considerably improved by the invention and, in the mutual adhesive strength of the layers, can be adapted to many applications.

The adhesive material, admixed with the material of at least one of the two layers which are to be bonded together, can for example be a hot-melt adhesive on the basis of an ethylene-vinyl acetate copolymer. The adhesive material admixed with the material of at least one of the layers which are to be bonded together can also be ionomer synthetic resin. For example, this latter group of adhesive materials includes especially copolymers of ethylene and carboxyl group containing monomers.

The adhesive material may be admixed with the plastic material provided for at least one of the two layers before or while such plastic material is introduced into the extrusion press. Such plastic material may be in granulated form and said adhesive material may have any suitable form able to be admixed with said granulated plastic material.

Depending on the desired adhesive strength between the two layers, the quantity of the adhesive material admixed to the material of at least one of the layers which are to be bonded together can be adjusted within the range between about five percent by weight and 50 percent by weight. The adhesive bond which can be obtained at the lower level of the weight of the admixed adhesive material practically conforms with and is preferably just above the adhesive strength which can be obtained without the use of adhesive materials. The adhesive strength obtained in this lower level of the range is generally only sufficient to maintain a surface-protecting layer on the thermally formed article during the article production process. If it is desired to obtain a greater adhesive bond, a greater amount of admixed adhesive material must be added. In the case where the admixed quantity of adhesive material is about 20 percent by weight, most of the combined layers have already developed their maximum mutual adhesion properties. The layer of the second material will then, in practice, remain on the article and after the thermal deformation processes or other operating steps, the waste web can then be separated again into the original components for reprocessing.

The invention includes as an object a process in which a continuous band or web of extruding thermoplastic synthetic material is covered with a layer of a second extrudable thermoplastic material and during or prior to extrusion of the layers through an ejection nozzle, but before reaching the outlet of the nozzle, an adhesive material in a predetermined quantity is admixed in uniform dispersion into the material of at least one of these layers which are to be bonded together, in order to inhibit the formation of a phase separation surface between these two layers and in order to form a predetermined adhesive strength bond between the layers.

Through the combination of layers to be bonded together before leaving the extrusion nozzle, the adhesive material which is admixed to at least one of the materials has its effectiveness fully developed, so that the quantity, and/or the type of the adhesive material, assures the predetermined adhesive bond strength between the layers.

In the production of molded articles of laminated material, in accord with this invention, a process is particularly suited in which the band, which is covered on one or on both surfaces with a detachably bonded foil, is cooled to a desired degree, immediately after leaving the extrusion nozzle in the hot plastic condition, on both surfaces for the purpose of stabilization so that the detachably bonded foil and perhaps a surface area of the layer beneath are still deformable, but still able to support a weight, while the mass of the band lying inside between the two cooled surface layers is essentially left at the extruding temperature and in plastic condition and whereby, during the thermal deformation, at least one previously cooled surface of the band is shaped by a cooled forming tool surface, and the uncooled mass is redistributed between the cooled surface layers in the manner of a plastic filler.

For a better understanding of the invention, several embodiments are now described:

PREFERRED EMBODIMENTS

Figure 1:
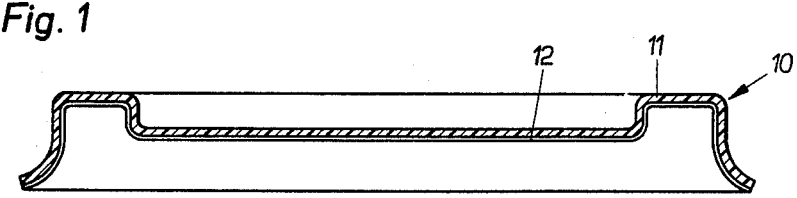
FIG. 1 shows in vertical section a cover of a container, for example a margarine container, made of a laminated material in accord with a preferred embodiment of the invention.
Figure 2:
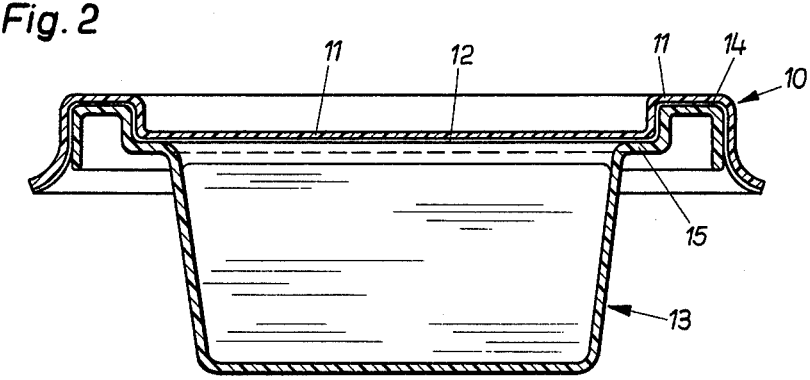
FIG. 2 shows in vertical section a container, closed and sealed with the cover of FIG. 1.
Figure 3:
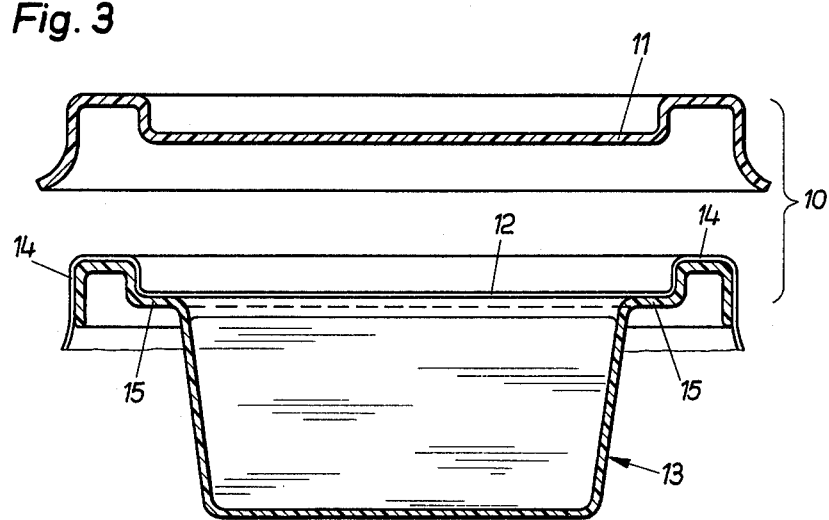
FIG. 3 shows in vertical section the container of FIG. 2 after the cover upper layer has been lifted off, leaving on the lower cover layer.

In the example of FIGS. 1 to 3, the container cover 10 is made of laminated material, of which the outer or carrier layer 11 itself, which is illustrated at the top, consists of impact resistant polystyrene, preferably a butadiene mixed polystyrene variation. The thinner inner layer 12 of cover 10 consists of basically a polyolefin foil, for example polyethylene or polypropylene. Normally, the two layers 11 and 12 would not inadequately adhere to each other. To remedy this, an adhesive material comprising an ethylene-vinyl acetate copolymer is admixed with the polyolefin layer 12, in a quantity of, for example, 10 percent by weight. Due to this admixture, the adhesive bond between the two contacting layers 11 and 12 is considerably increased. However, the layer 12 can still be easily detached from the carrier layer 11. This fact is also of advantage for the separate recovery of the residual materials from the remaining web portions after the covers 10 are cut from a web of the laminated material. The two layers 11 and 12 of residual materials can then be easily separated from each other, and separately reprocessed.

As shown in FIG. 2, the container cover 10 is placed on a container 13 of thermoplastic synthetic material, for example polyethylene or polypropylene, and is sealed as by heat and pressure around the circumferential edge 14, and, if necessary, also around the circumferential shoulder 15 of the container wall. This sealing can be accomplished through the carrier layer 11 without affecting the adhesive bond between the carrier layer 11 and the detachable foil 12. To open the container 13, as illustrated in FIG. 3, the outer carrier layer 11 of the cover 10 is first detached from foil 12 and lifted off the container. Covering the content of the container, the foil 12, which preferably has a thickness of about 100 microns, remains as a protective skin, which then must be cut off around the inner edge of the container shoulder 15 to gain access to the container contents. After the contents are removed partially or completely from the container, the carrier layer 11 of the cover can be replaced on the container at any time, whereby the remaining portions of the foil 12, which are solidly sealed to and remain on the edge 14 of the container, adhesively bond again to carrier 11 and act as a seal around the edge of the container.

Figure 4:
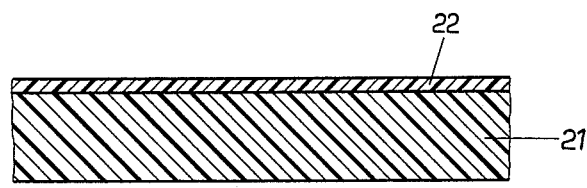
FIG. 4 is a fragmentary section showing laminated material in accord with the invention, of which one layer is formed as a thin cover coating.

In addition to the above-described application, many other applications are possible, in which a predetermined adhesive bond between the layers of laminated material is of importance. Thus, for example, FIG. 4 illustrates an application in which only a relatively thin outer cover layer 22 of polyolefin, for example polyethylene, is to be provided on an inner carrier layer 21 of impact resistant polystyrene. This laminated material can, for example, be considered for those applications for which substantial gas impermeability is of importance. To reduce expense here, the adhesive material is admixed with the relatively thin outer polyolefin layer 22. Depending on whether the polyolefin layer 22 is to remain on the carrier layer 21 only temporarily, and should therefore be especially easily detachable, or whether the polyolefin layer 22 should remain practically permanently on the carrier layer 21, and should thus be practically hardly detachable, the quantity of the adhesive material, for example a ionomer synthetic resin, will be adjusted in accordance with the particular application, to be present in a quantity between 5 percent by weight and 50 percent by weight of the polyolefin layer 22.

Figure 5:
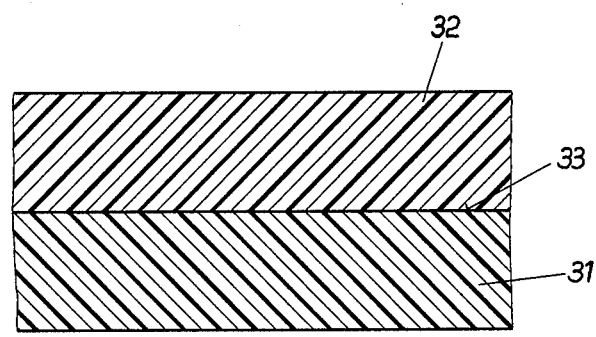
FIG. 5 is a fragmentary section showing a laminated material with two essentially equally thick layers.

FIG. 5 shows an example in which the two layers 31 and 32 of a laminated material are of practically equal thickness. This can again be an outer carrier layer 31 of impact resistant polystyrene or styrene-acrylonitrile copolymer, while the inner cover layer 32 can be a polyolefin or polycarbonate. In this example, the carrier layer 31 is composed of a mixture of impact-resistant polystyrene, for example styrene-acrylonitrile copolymer and an adhesive material, for example an ionomer synthetic resin. The mixing ratio of the two components can be 1:1, i.e. 50 percent by weight of the adhesive material can be provided. A relatively high bond is then obtained at the interface 33, which almost corresponds to the bonding strength which can be obtained with materials which normally bond to each other. However, because of the high content of adhesive material in the carrier layer 31, a laminating material in accord with FIG. 5 may be relatively expensive.

Figure 6:
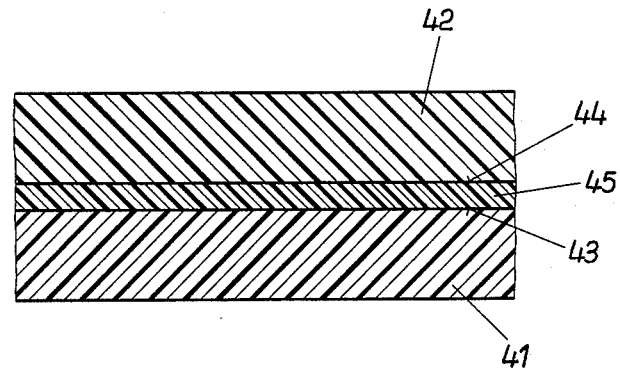
FIG. 6 is a fragmentary section showing a laminated material, in which a middle layer containing adhesive material is provided.

FIG. 6 shows another possibility for producing a laminated material in accord with the invention. In this example, a carrier layer 41, of polystyrene, preferably impact-resistant polystyrene or a styrene-acrylonitrile copolymer, is provided. The upper layer 42 consists, for example, of a polyolefin, for example polyethylene or polypropylene. Laminated material with such a cover layer 42 can be provided, for example, for those applications where it is important to reduce the permeability for water vapor and gases, and also to reduce the permeability of propelling gas through aerosol packings or gaseous cryogenic material. For the bonding of the top layer 42 with the carrier layer 41, a bonding layer 45 is provided, which, in this example, is formed of a material mixture, about one half of which consists of material of the top layer 42 and about one half of adhesive material. The weight proportion of the bonding layer 45 can, for example, amount to about 5 percent of the total weight of the laminated materials, so that a proportion of the adhesive material in the magnitude of about 2.5 percent of the total material is thus provided. With this relatively small proportion of adhesive material, a very good adhesion can be obtained both at the interface 43 between the carrier layer 41 and the bonding layer 45, and at the interface 44 between the top layer 42 and the bonding layer 45. The mechanical properties of the bonding layer 45 are largely determined by that material which is present in the top layer 42, so that the bonding layer 45 does not cause any change in the mechanical properties of laminated material. On the other hand, the cover layer 42 can be completely adapted to the specific properties required of it, for example, its permeability for water vapor or gases of various types, without any effect by the adhesive material in the top layer 42. In this example also, the adhesive properties, especially the adhesive bond, at the interfaces 43 and 44 can be adjusted by the selection of the particular quantity of adhesive material provided in the bonding layer 45. As a variation in comparison with the example of FIG. 6, a mixture of the material of the carrier layer 41 and adhesive material could be provided in the bonding layer 45.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A container assembly comprising a cup-shaped body of synthetic thermoplastic material selected from the group consisting of polyethylene and polypropylene having a rim around its upper open end, and a cover fitted upon said rim, said cover comprising two adhesively bonded mutually detachable coextensive layers of different synthetic plastic materials, with the outer of said layers being an impact resistant polystyrene and the inner of said layers being of substantially the same material as said body and permanently bonded directly to said rim and containing a dispersal of adhesive material capable of bonding said layers together, said adhesive material being an ethylene vinyl acetate copolymer present in the amount of about 10 percent by weight of said inner layer.

2. Laminated material comprising two surface contacting coextensive layers of extruded heat bonded different synthetic thermoplastic materials that normally do not adhere to each other, one of said layers being a material selected from the group consisting of polyethylene and polypropylene, and the other of said layers being a material selected from the group consisting of polystyrene styrene-acrylonitrile copolymers and polycarbonates, at least one of said layers containing a dispersed predetermined quantity of adhesive material dispersed therein, said adhesive material being characterized in that it is capable of bonding said layers together and that it is present in such controlled quantity as to provide a bond of predetermined strength between said layers, the quantity of the adhesive material admixed to the material of at least one of the layers which are to be bonded together being within the range of between about 5 percent by weight and 50 percent by weight of the material of that one layer as a function of the desired adhesive bond strength between the layers.

3. Laminated material in accord with claim 2 wherein said adhesive material is a substance selected from the group of hot melt adhesive compounds consisting of ethylene vinyl acetate copolymers and copolymers of ethylene with carboxyl groups containing monomer resins.

4. Laminated material comprising two coextensive layers of extruded synthetic thermoplastic materials that normally do not adhere to each other, one of said layers being a material selected from the group consisting of polyethylene and polypropylene, and the other of said layers being a material selected from the group consisting of polystyrene and styrene-acrylonitrile copolymer, an intermediate layer disposed between two layers in coextensive surface contact with both of said two layers, said intermediate layer containing one of said materials of said two layers and having a predetermined quantity of adhesive material dispersed therein, said adhesive material being characterized in that it is capable of bonding said layers together and that it is present in such quantity as to provide a bond of predetermined strength between said layers, the quantity of adhesive material by weight being about 2.5 percent of the total weight of laminated materials.

5. A process for producing laminated material wherein two coextensive layers of different synthetic thermoplastic materials that normally do not adhere to each other are extruded in surface contact and heat bonded, characterized in that prior to extrusion a predetermined quantity of a selected adhesive material capable of bonding said materials together is dispersed within at least one of said layers, the quantity of the adhesive material dispersed in said one of the layers being within the range of about 5 to 50 percent by weight of that one layer as a function of the desired adhesive bond strength between the layers.

6. The process defined in claim 5 wherein one of said layers is a material selected from the group consisting of polyethylene and polystyrene and other of said layers is a material selected from the group consisting of polystyrene, styrene-acrylonitrile copolymers and polycarbonates, and said adhesive material is a substance selected from the group of hot melt adhesive compounds consisting of ethylene vinyl acetate copolymers and copolymers of ethylene with carboxyl group containing monomer resins.

* * * * *